United States Patent [19]

Muis

[11] 4,190,686

[45] Feb. 26, 1980

[54] PROTECTIVE COMPOSITION AND METHOD

[76] Inventor: Louis H. Muis, 8527 Tampa Ave., Northridge, Calif. 91324

[21] Appl. No.: 930,891

[22] Filed: Aug. 4, 1978

[51] Int. Cl.$^2$ .................. B27K 3/52; B27K 5/04; B29J 5/02
[52] U.S. Cl. .................. 427/317; 260/17.2; 260/38; 264/102; 264/320; 427/386; 427/387; 427/388 A
[58] Field of Search .................. 260/38, 826, 17.2; 427/317, 387, 388 R, 388 B, 397, 386, 388 A; 264/102, 320

[56] References Cited

U.S. PATENT DOCUMENTS

| | | | |
|---|---|---|---|
| Re. 24,011 | 5/1955 | Ericks | 427/397 X |
| 2,672,104 | 3/1954 | Clark | 260/826 X |
| 2,884,388 | 4/1959 | Hedlund | 260/826 X |
| 2,921,041 | 1/1960 | Francis | 260/38 X |
| 3,008,847 | 11/1961 | Berge | 260/38 X |
| 3,305,504 | 2/1967 | Huntington | 260/826 X |
| 3,637,547 | 1/1972 | Orth | 260/38 X |
| 3,914,463 | 10/1975 | Mercurio et al. | 427/397 X |

Primary Examiner—Sandra M. Person

[57] ABSTRACT

The improved composition of the present invention can be set, in accordance with the present method, to a high temperature, corrosion resistant protective covering or coating on various types of substrates. The set covering is hard and tenacious, yet flexible and durable. Compressed wood products incorporating the same are fireproof, impervious to termites, fungus, dry rot, will not absorb moisture, are shape retaining and durable. The composition includes a thermosetting phenolic resin adhesive, leveling or bodying agents in the form of modified montmorillonite clay and silicone-containing resin, ceramic glaze material, and high temperature paint powder comprising selected thermosetting material such as polyester, epoxy, a mixture of polyester and epoxy, or acrylic resin, usually with a coloring agent. After the composition is applied to a clean substrate, it is cured to a hard, set, fully protective state by heating it at at least about 150° C. for at least about one hour. If the substrate includes wood, the wood should be degassified at at least about 100° C. for at least about one hour before applying the composition to it.

18 Claims, No Drawings

PROTECTIVE COMPOSITION AND METHOD

BACKGROUND OF THE INVENTION

1. Field of the Invention

The present invention relates to protective means and more particularly to an improved protective composition and method for a variety of substrates.

2. Prior Art

Many metals in various applications, as in the chemical industry, become exposed to the corrosive effects of acid and/or alkali and thus suffer rapid deterioration unless specially protected in some manner. Their deterioration is usually accelerated at elevated temperatures. Protective paints covering metallic surfaces are usually effective against either acid or alkali but are ineffective against both acid and alkali and, in any event, must frequently be replaced, often at considerable expense. Metals normally exposed to oxygen in the atmosphere, and to pollutants which are corrosive agents, such as sulfides, sulfates and the like, and metals exposed, as in the ground or in water to galvanic corrosion must also be carefully protected by special coating treatments, many of which are expensive and are of transitory benefit. Most such protective coatings are not fully protective against a broad spectrum of corrosive agents. Accordingly, there is a need for an improved means of protecting metals against various types of corrosion under a variety of conditions, including elevated temperatures.

Wood and wood products also suffer deterioration in normal use, in some cases due to termite or fungus infestation, dry rot and the like, and in other cases to effects of moisture and air. Such materials also are readily combustible and thus a fire hazard. Moreover, they can curl, crack, peel and fragment, due to excessive moisture, and thus lose their utility. It would be highly desirable to be able to effectively protect wood materials against all forms of deterioration and dimensional distortion and to render them fire resistant. It would also be desirable if the means employed for protection of wood materials would be equally useful in protecting metals against deterioration, as previously described.

SUMMARY OF THE INVENTION

All the foregoing needs are satisfied by the improved protective composition and method of the present invention. The composition and method are substantially as set forth in the Abstract above. They are equally effective on metal and wood substrates. Thus, the composition employs (a) a ceramic glaze material in powder form, (b) a phenolic thermosetting resin adhesive, containing a solvent such as an organic solvent, (c) leveling or bodying agents in the form of modified montmorillonite clay and silicone-containing resins, and (d) high temperature paint powder comprising thermosetting material such as polyester, epoxy, polyester plus epoxy, or acrylic resin plus (usually) coloring.

The composition is inexpensive and can be easily and rapidly applied in liquid or slurry form to a clean substrate, such as metal, wood or the like, as by spraying or dipping or can be mixed with wood shavings or sawdust, and then poured into a mold. The composition is then cured at elevated temperature of at least about 150° C. to a hard, fully set, protective condition. If the substrate is wood, it should first be fully degassified at at least about 100° C. for one hour to remove entrapped moisture, methane, volatile alcohols, etc.

The resulting composition-substrate composite is fully protected against fire, corrosion of all types, and dimensional distortion. The set composition either as a surface layer on the substrate or as the matrix of a molded wood (sawdust) item, is very hard and durable, yet sufficiently flexible to absorb shocks, etc. Molded wood products utilizing this composite can be used, for example, as studs, wallboard and other components in the building industry. Composites employing solid wood substrates can be used as shingles, shakes, joists, studs and other construction items. Further advantages of the improved composition and method and their products are set forth in the following detailed description.

DETAILED DESCRIPTION

The Composition

The improved composition of the present invention includes an unset thermosetting phenolic resin adhesive in any suitable concentration in a suitable solvent such as an organic solvent. For example, it is suitable and typical to supply the unset resin in an approximately 50 to 55 percent by weight concentration in benzene, tabene or the like. The phenolic resin is preferably manufactured from phenol and formaldehyde or a similar aldehyde (furfuraldehyde or the like) in the presence of an alkaline catalyst, the proportions of phenol and aldehyde being such as to permit the resin to be cured to a set solid state by heat alone. Thus, the phenol is either in an excess concentration or the proportions of the two constituents (phenol and formaldehyde) are equal stoichiometric. One typical resin adhesive which is suitable for use is a phenol-formaldehyde resin having equal proportions of both constituents. It is sold by Union Carbide Corporation under the trademark BLLB 3087 and has the following physical properties:

TABLE I

| | |
|---|---|
| Viscosity | 15–35 Centipoises |
| Specific Gravity | 1.080–1.105 |
| Solids | 50–54% by Wt. |
| 160° C. Hot Plate Gel Time | 120–165 Seconds |
| Flash Paint | 80°–85° F. Cleveland Closed Cup. |

The improved composition of the invention also includes a conventional ceramic glaze powder, without or without added inorganic coloring pigment, and of any suitable particle size, for example, 80–320 U. S. Standard Mesh. Thus, while the proportions of ingredients vary, the powder normally comprises a suitable mixture of a major proportion, by weight, of alumina, usually with silica and sometimes with borate, together with a minor proportion of calcia, magnesia, usually titania (usually) iron oxide, sodium oxide and usually potassium oxide. Lead-bearing frits which include lead oxide in substantial proportion may also be used. In fact, any suitable ceramic-containing glaze powder can be employed. Water soluble dyes and such pigments as cadmium oxide, copper oxide, chromium oxide and the like may be added to the glaze in small concentrations.

As a third ingredient in the improved composition of the present invention, a first gelling agent which functions as a leveling or bodying agent and surface tension breaker is employed. This is modified montmorillonite clay. One such product is sold under the U.S. Registered trademark Bentone 38 by N L Industries, Inc. of Hightstown, New Jersey. Bentone 38 is a creamy white powder comprising tetraalkyl ammonium smectite. It is conventionally used as a rheological additive for organic polar liquids and has the following physical properties:

TABLE II

| Specific Gravity, 25° C. | 1.7 |
|---|---|
| Weight per U.S. Gallon | 14.2 Lbs. |
| Moisture Content | 3.5% Max. |
| Loss on Ignition | 40.5% Max. |
| Apparent Density | 3.1 Lbs/U.S. Gallon |

Bentone 34 is a second suitable gelling agent useful in the improved composition of the present invention as a leveling or bodying agent and surface tension breaker. It is sold under the registered U.S. trademark of N L Industries, Inc. and has the same chemical description as Bentone 38. It is a creamy white powder with an apparent density of 2.8 lbs/U.S. gallon and other physical characteristics similar to Bentone 38. It is preferred to use both Bentone 34 and Bentone 38 in approximately equal proportion as the first backing and bodying agent in the improved composition of the invention.

The second leveling and bodying agent employed in the present improved composition comprises silicone-containing thermosetting resin containing a solvent such as xylol or toluol and useful as a surface tension breaker. This agent comprises, typically, a heat curable, fast baking silicone-polyester copolymer or a silicone resin. A number of commercially available additives meet this description and are suitable. Some are sold under the U.S. trademarks SR 82, SR 122, SR 124, SR 125, SR 182 and SR 240 of General Electric Corporation. Their physical properties are listed below:

TABLE III

| Property | SR-82 | SR-182 | SR-124 | SR-125 | SR-240 | SR-122 |
|---|---|---|---|---|---|---|
| Viscosity range | low | low | medium | medium | low | medium |
| Solids range | medium | medium | medium | medium | medium | medium |
| Heat loss at elevated T° | moderate | moderate | low | low | low | low-moderate |
| Baking speed | slow | slow | slow | slow | fast | fast |
| Solids content | 60±1 | 60±1 | 50±1 | 50±1 | 50±1 | 55±1 |
| Specific gravity | 1.06 | 1.06 | 1.01 | 1.00 | 1.02 | 0.97 |
| Solvent system | Xylol | Toluol | Xylol | Xylol | Xylol | Cellosolve acetate, toluene |
| Viscosity Bakersfield RVF Spindle #1 at 20 rpm (cps) | 15–35 | 15–35 | 125–225 | 120–300 | 40–60 | 100–200 |
| Flash paint closed cup ASTM D-56-36 | 80° F. | 35° F. | 80° F. | 80° F. | 75° F. | 135° F. |
| Weight per gallon | 8.9 | 8.9 | 8.4 | 8.3 | 8.5 | 8.1 |
| Resin system | silicone | silicone | silicone | silicone | silicne | silicone-polyester copolymer |

A further ingredient in the improved composition of the present invention comprises a high temperature paint powder (powder paint) comprising selected thermosetting resin and preferably a coloring agent and useful in finishing ceramic ware. The thermosetting resin may be any thermosettable polyester or epoxy, or polyester and epoxy mixture or acrylic resin in dry powder form without volatiles. It is material which conventionally can be electrostatically sprayed. In the present invention, however, it is merely added to the composition. Usually, the powder includes a color, such as metal particles, dry pigment or the like. A number of suitable commercial paint powders are available, notably those sold under the trademark Oxyplast by the O'Brien Corporation, Oklahoma City, Oklahoma, as powder coatings, either with a polyester resin, or an epoxy resin or a so-called "hybrid" mixture of the two. Thermosetting acrylic resins, well known in the art and based on methyl methacrylate but suitably cross-linked by acrylomide or the like can be used.

The improved composition of the invention is a homogeneous mixture which has the following range of proportions of ingredients (parts by volume):

TABLE IV

| Ingredients | Parts Range | Preferred |
|---|---|---|
| 1. Phenolic resin adhesive | About 90–110 | About 100 |
| 2. Modified montmorillonite clay leveling and bodying agent | About 5.4–6.6 | About 6 |
| 3. Silicon-containing thermosetting resin leveling and bodying agent | About 5.4–6.6 | About 6 |
| 4. Ceramic glaze powder | About 18–22 | About 20 |
| 5. High temperature thermosetting powder paint | About 9–11 | About 10 |

One preferred example of the improved composition of the invention comprises the following:

PREFERRED EXAMPLE 1

TABLE V

| Ingredients | Parts (by volume) |
| --- | --- |
| 1. Phenolic resin adhesive BLLB 3087 | 100 |
| 2. Bentone 34 | 3 |
| 3. Bentone 38 | 3 |
| 4. SR 82 | 6 |
| 5. Ceramic glaze powder A* | 20 |
| 6. Epoxy powder paint without coloring | 10 |

*Powder A has the following constituents:

TABLE VI

| Ingredients | Percent by Weight |
| --- | --- |
| $SiO_2$ | 41.70 |
| $Al_2O_3$ | 41.53 |
| $Fe_2O_3$ | 0.30 |
| CaO | 0.50 |
| MgO | 0.41 |
| $TiO_2$ | 0.77 |
| $Na_2O$ | 0.68 |

A second preferred example of the composition of the present invention comprises the following:

PREFERRED EXAMPLE 2

TABLE VI

| Ingredients | Parts (by volume) |
| --- | --- |
| 1. Phenol-formaldehyde resin X in toluene (50% solids) | 110 |
| 2. Montmorillonite clay Y (tetraalkyl ammonium smectite) | 6.6 |
| 3. Thermosetting silicone resin in toluol solvent (50% solids) | 6.6 |
| 4. Ceramic glaze powder A (Table V) | 22 |
| 5. Thermosettable dry epoxy resin hisphenol A-spechlorhydrin powder | 11 |

PREFERRED EXAMPLE 3

TABLE VII

| Ingredients | Parts (by volume) |
| --- | --- |
| 1. Resin X (Table VI) | 90 |
| 2. Clay Y (Table VI) | 5.4 |
| 3. Thermosetting polyester-silicone copolymer in toluene (55% solids) | 5.4 |
| 4. Ceramic glaze powder B* | 18 |
| 5. Thermosetting dry polyester resin powder | 9 |

*Powder B has the following composition:

TABLE VIII

| Ingredients | Percent (by weight) |
| --- | --- |
| $K_2O$ | About 2.76 |
| $Na_2O$ | About 2.17 |
| CaO | About 8.25 |
| PbO | About 19.10 |
| $Al_2O_3$ | About 8.34 |
| $B_2O_3$ | About 5.73 |
| $SiO_2$ | About 53.21 |
| Total | 99.56 |

Method

The composition of the present invention is formed in accordance with the present method, merely by uniformly mixing all the ingredients together in their proper concentration. The composition is then ready to be used. In this regard, also in accordance with the present method, the composition is applied to a suitable clean substrate to at least partially cover the substrate.

Conventional chemical and/or mechanical cleaning (scrubbing, brushing, etc.) can be used in the case of metal to remove oxide films, grease, dirt and the like to provide the desired clean substrate for application of the composition. In the case of a wood substrate, such as solid wood (lumber) as well as small pieces (shavings and chips) and sawdust, it is desirable to not only clean the wood, if dirty, but to degassify it. This is accomplished in accordance with the present method by heating the wood to at least about 100° C. in a vacuum chamber or the like for at least about one hour. Such treatment removes substantially all of the wood's moisture, methane and alcohol gasses. These can then be separately recovered and used for other purposes. Green unseasoned wood can be used in place of or in addition to seasoned wood for the substrate in the present method so long as the described degassification step is carried out.

After the cleaning of the substrate, the improved composition of the invention is applied thereto by any suitable procedure such as by spraying, painting, dipping, etc. Thus, wood can be sprayed with or dipped into the composition. Alternatively, a mixture of wood particles (chips and/or sawdust) and the improved composition can be formed into a porridge-like mass and then can be poured into a mold or form, compressed (if desired) and then cured. Thus, wood products in the form of studs, wallboard, insulating plates and the like can be made in this manner.

In accordance with the present method, the composition on the substrate is then cured at elevated temperature for a time sufficient to set the composition to a stable, solid state. This is accomplished by the use of a temperature of at least about 150° C. for at least about one hour. In the case of metallic substrates, a temperature of at least about 200° C. for at least about one hour is preferred.

During curing, the composition sets to a very hard, tenacious, durable yet flexible, fire resistant state which exceeds the corrosion resistance of known coatings.

In one preferred embodiment, the present method is practiced by forming the composition of Example 2 (Table VI) and then coating it to a thickness of about ⅛ inch on steel strips which have been previously degreased in toluene, scrubbed clean, rinsed in water and air dried. The strips are heated to 200° C. for one hour to set the coating and then subjected to the following tests:

1. Test strips A and B are heated at the center thereof to about 5,000° F. (cherry red), causing the coating at that point to vaporize. The coating at each strip end is at about 2,000° F. but remains unaffected.

2. Test strips A and B are strips C and D (which have not been heated to the 5,000° F. temperature) are immersed in concentrated aqueous nitric acid at room temperature for three hours, then removed, flushed with water and examined. No degradation is found in strips A, B, C and D (coating). There is also no reduction in dielectric properties.

3. Test strips A, B, C and D and also E and F are immersed in concentrated aqueous sodium hydroxide at room temperature for three hours, then removed, flushed with water and examined. Again, there is no degradation of the coating on strips A, B, C, D, E and F and no reduction in dielectric properties. 4. Test strips G and H are first immersed for three hours at 150° F. in an alkaline cleaner containing 50% (by volume) of alkali (NaOH), removed, water flushed and examined after which the strips are scratched to the base metal, then immersed in a commercial chemical paint stripper for three hours at 150° F., then removed, water flushed and reexamined. There is no degradation of the coating on strips G and H, no peeling of the coating and no loss of dielectric properties.

5. Strips A, B, C and D from the second test are each struck three hammer blows (light, medium, intense) but these have no effect on the coating.

Thus, heating coated metal to temperatures up to 2,000° F. or more does not destroy the set composition nor cause it to delaminate from the metal coated therewith. The set composition also is not impaired by immersion in strong acids and alkalies even at elevated temperatures.

Wood products incorporating the set composition are also very durable and dimensionally stable even in the presence of atmospheric moisture and mildew, rot, fungus and termite-proof, as well as fire retardant.

In a second preferred embodiment of the present method, the composition of Example 3 (Table VII) is first formed, and then applied to a wood substrate after the wood has been degassified. Degassification is carried out by placing the wood in a vacuum chamber and subjecting it to a suitable vacuum (750 mm Hg.) at 100° C. for one hour until essentially all moisture, methane and volatile alcohol vapors are removed from the wood. The wood substrate comprises a number of wood shingles which are immersed in the composition for one minute then withdrawn and heated to 150° C. for one hour to permanently set the coating composition. The finished treated shingles resist combustion from an open flame and warpage from immersion in water. They retain their shape and do not crack, peel or curl. Moreover, they are impervious to biological infestation.

In a third embodiment of the present method, the composition of Example 1 (Table V) is formed, whereupon a mixture of wood chips and sawdust which has been previously degassified in a vacuum (750 mm Hg) at 120° C. for 1½ hours is uniformly mixed into the composition to form a porridge. The resulting mixture is poured into a wallboard mold, then slightly compressed (100 psi) and permanently set by heating it to 150° C. for one hour. The resulting wallboard is structurally stable, durable, fireproof and resistant to infestation by fungi, dry rot, termites, etc.

Accordingly, the present method utilizing the present composition results in fully protected products of improved utility. Various modifications, changes, alterations and additions can be made in the improved composition of the present invention, its components and parameters and in the improved method of the present invention, its steps and parameters. All such modifications, changes, alterations and additions as are within the scope of the appended claims form part of the present invention.

What is claimed is:

1. An improved protective liquid-containing composition, for high temperature corrosion resistant coatings, said composition comprising a mixture of:
   a. about 18–22 parts by volume of ceramic glaze material in powder form, said material comprising a mixture of the oxides of silicon, aluminum, sodium and calcium, together with the oxides of at least one of magnesium, iron, titanium, potassium, lead and boron;
   b. about 90–110 parts by volume of adhesive comprising thermosetting phenolic resin in a solvent;
   c. about 9–11 parts by volume of high temperature paint powder comprising thermosetting resin selected from the group consisting of polyester resin, epoxy resin, acrylic resin and a mixture of epoxy resin and polyester resin, and a coloring agent; and,
   d. about 10.8–13.2 parts by volume of leveling agent comprising at least one of organo-modified clay and thermosetting silicone-containing resin.

2. The improved composition of claim 1 wherein said adhesive is present in said composition in a major proportion by volume.

3. The improved composition of claim 2 wherein phenolic resin comprises phenol-formaldehyde resin.

4. The improved composition of claim 1 wherein said organo-modified clay comprises modified montmorillonite clay gelling agent.

5. The improved composition of claim 1 wherein said silicone-containing resin comprises at least one of silicone resin and silicone-polyester copolymeric resin.

6. The improved composition of claim 5 wherein both said silicone-containing resin and said organo-modified clay are present in said composition.

7. The improved composition of claim 2 wherein said composition in parts per volume is as follows:

| | |
|---|---|
| said phenolic adhesive | about 90–110 |
| said modified clay | about 5.4–6.6 |
| said silicone-containing resin | about 5.4–6.6 |
| said ceramic glaze powder | about 18–22 |
| powder paint | about 9–11 |

8. The improved composition of claim 7 wherein in parts per volume in said composition, said adhesive is about 90, said modified clay is about 6, said silicone-containing resin is about 6, said ceramic glaze powder is about 20 and said powder paint is about 10.

9. An improved method of protecting a substrate against high temperature corrosion, which method comprises:
   a. forming a liquid-containing mixture comprising
      (1) about 18–22 parts by volume of ceramic glaze material in powder form, said material comprising a mixture of the oxides of silicon, aluminum, sodium and calcium, together with the oxide of at least one of magnesium, iron, titanium, potassium, lead and boron
      (2) about 90–110 parts by volume of adhesive comprising thermosetting phenolic resin in a solvent
      (3) about 9–11 parts by volume of high temperature paint powder comprising thermosetting resin selected from the group consisting of polyester resin, epoxy resin, acrylic resin and a mixture of polyester resin and epoxy resin, and a coloring agent and,
      (4) about 10.8–13.2 parts by volume of leveling agent comprising at least one of organo-modified clay and thermosetting silicone-containing resin,
   b. applying said mixture as a layer of desired thickness on a clean substrate to at least partially cover said substrate; and,
   c. curing said applied layer at at least about 150° C. for at least about 1 hour until said layer is thermoset to a corrosion resistant, hard, dense, fire resistant, flexible protective covering.

10. The improved method of claim 9 wherein said substrate comprises metal and said curing is effected at about 200° C. for at least about one hour.

11. The improved method of claim 9 wherein said substrate includes wood and wherein said substrate, before applying said mixture thereof, is heated to at least about 100° C. for at least about one hour in a vacuum to degassify said wood, that is, to remove moisture, methane and alcohol gasses from said wood.

12. The improved method of claim 11 wherein said substrate comprises wood shavings and wherein after said application of said mixture thereto said wood shavings are compressed to predetermined size and density before said curing.

13. The improved method of claim 11 wherein said substrate comprises wood in subdivided form, and wherein said application of said mixture thereto is effected by immersion of said wood in said mixture to form a pourable mixture, wherein said mixture is poured into forms of predetermined dimensions and pressed before said curing.

14. The improved method of claim 9 wherein said phenolic resin comprises phenol-formaldehyde resin.

15. The improved method of claim 9 wherein said ceramic glaze material includes silica, alumina and inorganic coloring agents.

16. The improved method of claim 9 wherein said clay comprises montmorillonite clay and said silicone-containing resin contains at least one of silicone resin and silicone-polyester copolymeric resin.

17. The improved method of claim 9 wherein said mixture, in parts per volume, is as follows:

| | |
|---|---|
| said phenolic adhesive | about 90–110 |
| said modified clay | about 5.4–6.6 |
| said silicon-containing resin | about 5.4–6.6 |
| said ceramic glaze powder | about 18–22 |
| said paint powder | about 9–11 |

18. The improved method of claim 17 wherein said mixture, in parts per volume, is as follows:

| | |
|---|---|
| said phenolic adhesive | about 90 |
| said silicone-containing resin | about 6 |
| said modified clay | about 6 |
| said ceramic glaze powder | about 20 |
| said powder paint | about 10 |

* * * * *